United States Patent
Biderman et al.

(10) Patent No.: US 12,081,039 B2
(45) Date of Patent: Sep. 3, 2024

(54) MULTIPLE BEAM WIRELESS POWER TRANSMISSION SYSTEM

(71) Applicant: Wi-Charge Ltd., Rehovot (IL)

(72) Inventors: Yoav Biderman, Tel Aviv (IL); Ortal Alpert, Ness Ziona (IL); Omer Nahmias, Aminadav (IL); Lior Golan, Ramat Gan (IL); Ran Sagi, Tel Aviv (IL); Zohar Levin, Rehovot (IL); Ori Mor, Tel Aviv (IL); Alexander Slepoy, Chandler, AZ (US); Yan Rosh, Tel Aviv (IL); Eyal Conforti, Tel Aviv (IL)

(73) Assignee: Wi-Charge Ltd., Rehovot (IL)

( * ) Notice: Subject to any disclaimer, the term of this patent is extended or adjusted under 35 U.S.C. 154(b) by 186 days.

(21) Appl. No.: 17/401,844

(22) Filed: Aug. 13, 2021

(65) Prior Publication Data
US 2021/0384776 A1    Dec. 9, 2021

Related U.S. Application Data

(63) Continuation of application No. 16/959,537, filed as application No. PCT/IL2019/050010 on Jan. 2, 2019, now Pat. No. 11,095,166.
(Continued)

(51) Int. Cl.
*H04B 10/00*      (2013.01)
*H02J 50/30*      (2016.01)
(Continued)

(52) U.S. Cl.
CPC .............. *H02J 50/30* (2016.02); *H02J 50/40* (2016.02); *H02J 50/80* (2016.02); *H04B 10/807* (2013.01)

(58) Field of Classification Search
CPC .. H04B 10/807; H04B 10/806; H04B 10/808; H04B 10/112; H04B 10/1123;
(Continued)

(56) References Cited

U.S. PATENT DOCUMENTS 6,396,577 B1    5/2002   Ramstack
6,534,705 B2 *  3/2003   Berrios ..................... F03H 3/00
                                                        323/221
(Continued)

FOREIGN PATENT DOCUMENTS

CN      102301255 A    12/2011
CN      102768783 A    11/2012
(Continued)

OTHER PUBLICATIONS

Notice of Allowance for U.S. Appl. No. 16/959,537, dated Apr. 14, 2021, 17 Pages.
(Continued)

*Primary Examiner* — Hanh Phan
(74) *Attorney, Agent, or Firm* — Maine Cernota & Curran

(57) ABSTRACT

A system for transmitting wireless power from multiple sources to multiple receivers, in which the safety of the system is maintained in spite of the possibility that two beams may intersect in the transmission space, thereby generating power or power density levels which exceed those at which the safety mechanisms of the system were designed to operate. The paths of the beams are known from the transmission positions and directions, and from the positions and orientations of the receivers, as measured by positioning devices on them. When an intersection, or near intersection of beams is determined, the system is triggered to reduce the safety risk by attenuating or turning off, or by diverting, one or more of the beams. In addition, since a reflected beam's path may not be readily discernable, the
(Continued)

system can ascertain if one of the beams has undergone a reflection, by looking for displayed mirror images.

7 Claims, 6 Drawing Sheets

Related U.S. Application Data

(60) Provisional application No. 62/612,798, filed on Jan. 2, 2018.

(51) Int. Cl.
  *H02J 50/40* (2016.01)
  *H02J 50/80* (2016.01)
  *H04B 10/80* (2013.01)

(58) Field of Classification Search
  CPC ............ H04B 10/1127; H04B 10/1129; H04B 10/114; H04B 10/1143; H04B 10/1149; H04B 10/503; H04B 10/564; H02J 50/80; H02J 50/30; H02J 50/50; H02J 50/60; H02J 50/40
  USPC ........ 398/171, 115, 118, 119, 128, 130, 129, 398/131, 162, 158, 159, 33, 38, 127; 136/292, 291, 293, 244
  See application file for complete search history.

(56) References Cited

U.S. PATENT DOCUMENTS

| | | |
|---|---|---|
| 2005/0273218 A1 | 12/2005 | Breed |
| 2006/0266917 A1 | 11/2006 | Baldis et al. |
| 2010/0320362 A1 | 12/2010 | Alpert et al. |
| 2014/0073337 A1 | 3/2014 | Hong |
| 2016/0079810 A1* | 3/2016 | Frantz .................... H02S 10/00 307/104 |
| 2016/0197494 A1* | 7/2016 | Kwon .................. H04B 5/0037 307/104 |
| 2016/0197522 A1 | 7/2016 | Zeine et al. |
| 2017/0077765 A1 | 3/2017 | Bell et al. |
| 2017/0294809 A1* | 10/2017 | Slepoy ...................... H02J 7/35 |
| 2017/0346347 A1* | 11/2017 | Abiri ....................... H02J 50/30 |

FOREIGN PATENT DOCUMENTS

| | | |
|---|---|---|
| CN | 102798847 A | 11/2012 |
| CN | 103155353 A | 6/2013 |
| CN | 106877524 A | 6/2017 |
| WO | 2016179158 A2 | 11/2016 |
| WO | 2017147206 A1 | 8/2017 |
| WO | 2019135226 A1 | 7/2019 |

OTHER PUBLICATIONS

Translation of Office Action in CN Patent Application No. 201980015195.8, dated Mar. 25, 2023, 6 pages.
Extended European Search Report in EP Patent Application 1973513.6, dated Aug. 30, 2021, 6 pages.

\* cited by examiner

MULTIPLE BEAM WIRELESS POWER TRANSMISSION SYSTEM

RELATED APPLICATIONS

This application is a continuation of U.S. patent application Ser. No. 16/959,537, which is a national phase application filed under 35 USC § 371 of PCT Application No. PCT/IL2019/050010 with an International filing date of Jan. 2, 2019, which claims priority of U.S. Patent Application 62/612,798 filed Jan. 2, 2018. Each of these applications is herein incorporated by reference in its entirety for all purposes.

FIELD OF THE DISCLOSURE

The present invention relates to the field of power transmission of beams for providing energy to remote receivers, especially relating to the safe operation of such systems where multiple beams are transmitted.

BACKGROUND

The prior art on wireless power transfer using collimated electro-optical beams focuses mostly on transmitting a single beam from a single source to a single target. Multiple targets may be present in the environment, but the systems are configured to transmit to a single target at any point in time, and may then transmit to another target at a different time.

In PCT/IL2016/050927, for "Wireless Power Distribution System", published as WO 2017-033192, and having common inventors with the present application, there is described a system for transmitting power from one or more transmitters to one or more receivers. In that publication, the safety aspects of the system are largely limited to the question of safe levels of charging for the receiver batteries.

There therefore exists a need for a multiple beam wireless power transmission system which takes into account the safety of a system involving the simultaneous propagation of multiple beams to multiple target receivers, thereby overcoming at least some of the disadvantages of prior art systems and methods.

Though the most commonly used wireless power transmission systems are based on optical laser transmission, the same problems arise with other forms of wireless transmission such as phased array RF transmission, or ultrasound beam transmission.

The disclosures of each of the publications mentioned in this section and in other sections of the specification, are hereby incorporated by reference, each in its entirety.

SUMMARY

The current described systems are composed of multiple emitters, usually in a single transmitting unit, emitting separated and usually collimated or nearly collimated beams, usually targeted at one or more separated targets in the receiver, while the energy delivered into different targets in the same receiver is usually summed and delivered as a single output to the client device. The targets are generally photovoltaic cells for converting the optical power to electrical power. In some cases, it may be preferable to use the two sources separately, such as in cases where control of multiple functions from the transfer is needed, or if different voltages are needed, or if one source is used for battery charging and the other to power a circuit, or for reducing potential safety limits in any beam, or for any other reason.

The different beams are directed towards different directions by beam steering modules, each beam steering module covering a volume into which the beam can be directed. The volumes are typically a cone or a pyramid-shaped volume, or some other usually diverging 3D volume. The spatial region where the beam can be used to deliver power, up to the limit of its range, is called field of view or FOV.

The FOV of each beam preferably overlaps with the FOV of other beams such that two beams may be used to provide an increased amount of power to qualified receivers. Alternatively, the different FOVs may be used to increase the overall FOV of the system.

The systems of the present disclosure may also arrange positioning of two or more transmitters such that their FOV's overlap. Such configurations have similar advantages and problems to those of a multi beam system.

When a beam is aimed at a target, if safety measures permit, the beam's power may be increased so that an increased amount of power may be delivered by it. A receiver may have more than one target on it, a target being the region where the beam is intended to be incident upon.

The beam is typically emitted from a laser or another beam generator source inside the transmitter unit. Other types of collimated or nearly collimated beams may also be used. The beam's shape and size are manipulated so that it forms a spot, preferably no larger than the target at the desired range, or if larger, not by much, and most of the power can thus be absorbed by the receiver. The transmitted beam power can be attenuated by control of the beam source, and can likewise be turned off either at the beam source, or by use of a mechanical or electro-optical shutter.

The beam may be directed towards the target using a beam steering element, such as a moving or scanning mirror or an acousto-optic reflector. The beam then passes through the space towards the targets, and may traverse optical components on its way out of the transmitter, such as a dust protection window. A wavelength having low attenuation in the environment is advantageously chosen. The beam then arrives at the receiver front window. Although the receiver front window may be anti-reflection (AR) coated, a not insignificant reflection from the front window may be created. Such a reflection may arise because the beam may impinge on the receiver from different directions, at which the AR coating is not operating with its optimum effect, or the AR coating may be damaged or not perfect, or the front surface may be unclean, such as contaminated with dust or spilled liquid. A typically small portion of the beam may then be reflected by the front surface of the receiver into the surroundings and another, typically larger, portion of the beam may be absorbed by the receiver and converted to electrical energy.

The power from multiple absorber targets in the same receiver is typically combined into a single electrical output having a single voltage.

Unlike prior art single beam systems, or even prior art fixed systems where all reflections are known and controlled, when multiple beams are present and the targets are free to move around, such as with a system for providing wireless power to mobile phone devices in a room, there may many additional risks arising from the presence of multiple beams propagating within the same space, and this presents additional difficulties in building a safe, efficient working system.

Beam Intersections

Specifically, new risks arise when multiple beams are freely directed inside the same space, one such new risk being the problem of increased beam powers at any points of intersection of propagating beams. Prior art safety systems are typically concerned with whether specific beams are safe. The hazard region is then in the form of the beam trajectory line, and when an object, such as a human or a pet approaches that line, the safety system responds in a manner that would ensure a safe response to the intrusion. With multiple beams present, beam crossing points exist, where the hazard to humans and pets can generally be higher. Such intersection points occur where two, or very rarely more, transmitted beams cross each other, or where two (or more) beams reflected from a receiver intersect, or where a reflected beam intersects a transmitted beam.

When such two beams cross, the exposure may exceed the values designed for a single system and may exceed safe limits, even though the power lost from each separate beam is small. It should be noted that different safety systems may look for different parameters to determine safety. Furthermore, some parameters, such as beam diameter, may be known in different positions in the beam, and hence, a safety system may be based on estimating power loss, power per area loss, portion of area covered, portion of power covered or any of many other similar parameters. For example, should the safety limit for each beam be such that the safety system is designed to prevent E mw exposure from that beam, E mW being a safe level of exposure, then at the crossing point of two beams, a person or pet may be exposed to up to 2 E mW, which may be above the required safety level.

The currently described systems are capable of calculating and measuring transmitted and reflected beams in a system, and of analyzing the intersection points between them, and of counteracting any ensuing hazard when needed.

The currently described systems also provide a method of detecting such intersection points, evaluating the related risks and performing actions to avoid such risk.

The currently described systems further provide an easy-to-implement method of determining such risks.

The currently described systems also provide multiple ways for determining the relative position of different systems.

The currently described systems are capable of determining beam starting points and beam direction within the common coordinate system of the relevant components of the system.

The currently described systems are capable of determining the direction of reflections in absolute space, relative to other beams in the vicinity, within or close to the field of view.

The currently described systems are also able to communicate with nearby systems, or with an external system, determine the relative positions and or orientation of nearby systems and especially beams and transmit its relative position and or orientation to said other systems or said external system.

Receivers in the current system are able to communicate their orientation, identity ID and the ID of the transmitted beam powering the receiver.

After sharing the information, at least one of the systems calculates the "risk map" for potential crossing points between power beams and reflections from receiver(s), to determine if there are points of increased hazard. Should such a hazard point be found, and optionally after estimating the total available power at the hazard point, then safety information is exchanged between the different safety systems, or at least one beam is moved, or its power reduced or switched off.

Once the location and orientation of the sources, and the continuously variable location and orientation of the receivers, and hence the directions of reflections therefrom, are known, the problem of determining and warning of situations in which two beams or their reflections intersect, can then be undertaken. Two or more transmitted beams from separate beam sources on a single transmitter are considered, each beam directed at a different target. Since the relative geometrical position of the two sources is known from the manufacture of the transmitter unit, and the position and orientation of the targets is known continuously to the system, from the electronic modules associated with the targets, such as compass/accelerometer MEMS devices as described hereinbelow, the three-dimensional coordinate representation of each beam line is known. By use of widely available geometrical algorithms based on three-dimensional Euclidean geometry, as is known in the art, it can readily be determined if the two transmitted beams intersect somewhere along their trajectory to the targets, or whether they have skew trajectories, and thus do not intersect.

An alternative method of determining if an intersection is to occur is based on the observation that if two lines intersect, then they must lie in a common plane. Expressed conversely, if it can be determined that the two lines lie in a common plane, they must intersect, on condition that they are not coincidental, or that they are not parallel. A novel method of this disclosure determines if two beams have an intersection point, or at least get close to an intersection point, by means of the following algorithm. A set of planes are incrementally rotated around the trajectory of one beam, which is thus located at the common axis of rotation of the incrementally rotated planes. It is then determined whether the second beam passes through any of these incrementally rotated planes within a predetermined minimum distance from the first beam. If so, then those beams are considered to have an intersection point, or a close-to-intersection point, and in order to ensure laser safety, appropriate action must be taken to reduce the risk, such as by shutting down or reducing the laser power of at least one of the beams, or by diverting one of the beams.

In practice, this method may be performed by calculating the plane formed by a first beam and at least one point on a second beam. This point may typically be the beam origin or its target, since these points are best known and easiest to calculate. Then if another point on the second beam is close to the first beam axis, typically, within a few mm, or within a few radii of the beam, then intersection is likely and further action to alleviate the hazard of such an intersection, as described above, may be needed. On the other hand, if the closest point to the plane on the second beam is far from it, typically, more than a few mm, more than the calculation error margin, or more than a few beam radii, then the initial risk potential is lower.

An advantage of this method, is that, if both beams are reflected by a single flat surface, such as the front surface of a receiver having more than one target, then, if the original beams were not intersected, then the reflections would also not intersect. In such a case there is no need to determine the orientation of the receiver or to calculate the directions of reflections. This is because the crossing point between a reflection from one beam and the reflection from the other may also be ignored, because should a beam intrusion occur, it would be exposed to the transmitted beam from a first side, and to the reflected beam from a second side, such that the effects of the beams will not be cumulative.

This procedure is computationally faster than calculating the direction of reflections, involving determining the relevant receiver directions, and provides a safe estimate for all receivers having multiple targets and a single flat entrance window.

If the two beams are diverging from their sources, then the initial risk potential is also considered a low initial risk potential, and no safety warning event is triggered. On the other hand, if the beams are converging and on the same plane, the system either changes the power, direction or another beam parameter (duty cycle for example) of at least a single beam or combine the data from the two separate safety systems to implement a more rigid criterion for taking action in the event of the intersection indicated.

The quick evaluation procedure may respond to two beams essentially crossing each other, which means they are also on the same plane, by attenuating, turning off or shifting a beam.

An alternative to attenuating, turning off, or shifting the beam is to combine the risk estimations from both safety systems, making the two safety systems more sensitive, thus keeping the system safe.

When beams are not on the same plane or are not converging, then the orientation of receivers is determined, the position of receivers is determined and the reflections from the front surfaces of the beam is calculated. Should a beam or its reflection cross, or pass in the close vicinity, of another beam, then an action is taken to reduce the risk.

Such action may be by combining the data from both safety systems and estimating the combined risk from both systems. This typically results in a more sensitive threshold for turning off the beam.

Alternatively, at least one of the beams is either reduced in power or shifted from that position.

In many situations it is preferable, should the system be equipped with more than two beams, to use a different set of two beams to perform the desired action.

Defining Beam Trajectories

Each target and each beam has an identity, 10, and other components in the system are capable of detecting the 10, allowing the system to determine the source and target of each beam. The 10 code of receivers is identifiable by transmitters, which is normally done by transmitting a code to the transmitter, but identification of patterns, such as the patterns to be mentioned below in connection with beam reflection detection, or a barcode, may also be used as an ID.

The system uses this data to determine the starting point and the target point, which could also be a reflection point of the beams. Each beam starts at the transmitter and is aimed at a receiver, a reflection of some of the power may be generated by the receiver which is dependent upon its structure and orientation.

The system determines, based, at least partially on the receiver's ID, the reflection properties of the beam, including properties as to how much is reflected, at what angle to the beam, how divergent is it, and other properties, such that not only the transmitted beams are characterized, but also any reflected beams.

There should be at least one detection system for the position, ID, and relative direction of at least some of the beam emitters and receivers. Receivers and transmitters may be equipped with an orientation detector, which may comprise an accelerometer, indicating the direction of gravitational action, and/or a compass, indicating magnetic north.

Alternative implementations include (a) a mechanical connection to a device that has a known position, (b) a camera in one of the components to determine the orientation, direction or distance of other components, (c) the distance and orientation of a component determined by analyzing reflections from a grating on the component, (d) a camera on a component may be used to determine the relative position of the component based on analyzing the surroundings position, (e) use of a GPS (f) RF or sound reflections from the component may be used to determine its position and orientation, and (g) determining the position of a receiver is by triangulating it from at least 2 beam sources.

A beam module may detect the relative position of another beam module by calculating the vector from itself to a known receiver, and subtracting the vector from the other beam module to the same receiver. If the other beam module is powering a different target which has a known distance from the first target, then the vector is added into the calculation.

Such a situation may arise when a receiver is equipped with more than one target, such as to facilitate increased FOV or increased power.

A beam module may detect the relative position of another beam module also by receiving that position from a second system which already has its position.

Another method for fixing the position of one laser system relative to the other is to mechanically connect the two systems using a rigid mechanical holder ensuring the distance and orientation between the two beam modules. When such mechanical connection is made between two or more beam modules, and when information about the direction of lasing between the modules in transferred, the system may calculate the trajectory of the beams and may prevent the beams, from crossing each other.

Similarly, a method for fixing the position of one target relative to the other is to mechanically connect the two targets using a rigid mechanical holder ensuring the relative distance and orientation between the two targets. If such mechanical connection is made between two or more targets and if the relative direction of the surface(s) causing reflections is known, and if the direction of incoming beams is known, it is possible to project the direction of reflections and respond when such a reflection crosses another reflected beam or a transmitted beam.

Alternatively, a flexible receiver having more than one target may have sensors allowing it to determine and transmit the relative position between its targets.

One method to determine the orientation of the reflective surfaces of different targets is to have a common reflector, typically a unified front window.

Control Unit

A control unit is configured to respond to detection of either beam reflection from an intermediate surface, or two beams passing in close proximity to one another, or a transmitted beam and a reflected beam passing in close proximity to each other, or a reflected beam and a transmitted beam passing in close proximity to each other, and to take action to eliminate the problem. Such action can include a reduction of the power of one or more of the transmitted beams, or turning a beam off completely, redirecting one or more of the beams in a different direction, reduction of the radiance of one or more of the beams, or causing the user to perform an action such as by sounding an alert signal.

Alternatively, the control unit may operate the safety system in a manner taking into account the possibility of combined risk from different beams, for example by way of making the threshold for a security action, such as turning off the beam, or diverting it, stricter. For example, when two beams do not intersect, the safety system may respond when 5% of the beam is being blocked, while if the beams do intersect the safety threshold may be changed to 2.5% of either beam.

There should be a communication channel for the relevant data to reach the point where such a decision is made. There should be at least one control point in the system, where data about the starting point position, the target and receiver orientation is received. The direction of at least some of the transmitted beams and possibly their reflections are calculated, and when a problem is detecting, an action is taken eliminating it using decisions accordingly made. The control point may be distributed between several systems and locations in the system. Such a control point is in data connection with at least some of the subsystems, both beam systems, and receivers used in the power transmitting apparatus.

Reflecting Surfaces

Another danger which may be present in any beam transmission system is the presence of unintended reflecting surfaces in one of the beam paths. The reflection from such an unintended intervening reflecting surface may generate a user hazard, since it may not be taken into account by the safety system installed. In order to overcome this problem, the current systems are adapted to be capable of detecting such a reflecting surface in the beam path, and to either turn the beam off or to reduce its power, or to change its direction. As an alternative, or in addition, the system can be configured to impose more rigid safety criteria to ensure that the changed trajectory of the beam reflected, as a result of the additional reflection, will be protected by the heightened safety system criteria. The safety system may also be able to warn and take action if a reflection from the front surface of a receiver is detected.

The existence of a reflection in a mirror somewhere along the trajectory of one of the beams can be readily ascertained by inspection of an image of the target, viewed down the same trajectory as the beam was directed. The image of the target can advantageously be acquired by using the beam source at low power as a scanning device, which can scan the target to provide an image thereof. The target is equipped with an asymmetric pattern, whose shape is known or whose shape can be algorithmically verified, such as in the case of a 2D barcode. The pattern should be non-identical to itself under at least one mirror plane or improper rotation operation, and preferably either an asymmetric pattern or a symmetric pattern which has types of symmetry involving any rotation and movement operations and an odd number of mirroring operations.

If the scanned image of that object or the received beam shape, appears with the same symmetry as the shape of the object itself or the transmitted beam shape respectively, then no mirror reflection has likely occurred along the trajectory. This is a conditional statement since an even number of mirrors may cause a false negative result, while noise in the measurement channel may cause a false positive result. If on the other hand the scanned image appears with the opposite symmetry to that of the object, that indicates that the image path has undergone a reflection in a mirror, and hence that the transmitted beam has undergone the same reflection. The receiver detects the beam shape and either determines if it is mirrored or not, or transmits the relevant information for some other unit to determine it.

Such a pattern may consist of shapes, points or components which are distinguishable. Distinguishing the patterns may be done through their position, relative position, response (such as reflection, colored reflection, electronic response, blinking, RF transmission, movement, vibration, reflection properties, fluorescence, or any other response detectable outside the receiver).

As an alternative to an asymmetric pattern, a barcode or a 2D barcode can be used in order to determine right or left order. If the trajectory has not undergone a mirror reflection, the barcode will be read with its intended and correct code. If on the other hand the trajectory has undergone a reflection, the barcode will be read with an incorrect code, such that the presence of the mirror reflection can be simply determined.

As an alternative to optical scanning of the image of an asymmetric object on the target, a purely electronic determination can be made of the symmetry of the image. This method uses a series of symmetrical targets arranged in a pattern, each target being labelled with a marker code corresponding to its relative position, and which can be transmitted through a network connection to the transmitter. The beam is moved from one target to a neighboring one, and the directionally sensitive detector circuit is capable of determining the directional order in which signals from the images are being read. This is achieved by noting whether the new target detected, as determined by electronic reading of its code, reads in the same direction as that in which the beam was moved, indicating no reversal of symmetry as a result of a direct path, or in the opposite direction, indicating a reversal of symmetry as a result of a reflection in a mirror.

Systems combining both the optical and electronic methods may also be implemented, such as a partially symmetric optical pattern in one direction and a partially symmetric electronic pattern in another.

The electronic transmission may be replaced by another means of communicating data, such as IR, ultrasound, or optical signaling.

Combining Power Output from Multiple Photovoltaic Cells

In a receiver, when two or more targets are used to absorb and convert the power of two or more incident beams to electrical power, the electric power from the different photovoltaic (PV) circuits may be combined into a single power supply. There are various methods of achieving this combining.

The voltage from a single PV cell may not be sufficiently high for operation of electronic circuits which are typically needed in order to perform some safety functions essential for the system to increase its power emission above a minimal safe level.

Combining the voltage from multiple cells connected in series, therefore has been the option of choice in many prior art systems to generate the higher voltages typically required by electronic circuits.

The voltage from the cell (or cells) needs a DC/DC converting circuit to increase the voltage to levels where most electronic circuits can operate. Typically, most silicon-based electronic circuits operate above 1.2V, and optionally at 1.8V, 3.3V, and 5V. Some circuits operate at lower voltages but it is difficult to design a circuit which operates below 1V, and very difficult to do so below 0.8V. The cells used for wireless power transmission using infrared light, typically produce less than 0.5V per junction and typically only a single junction is used per cell.

In the currently described systems, there may be more than one PV cell per receiver, and the power output from the different cells is combined and fed into a DC/DC converter to increase voltage to more than the 1 V level.

If the output from multiple PV cells are connected in Series, the DC to DC circuit will have optimal performance when operating at a voltage close to the sum of voltages of the different cells. The drawback of connecting the cells in series is that power can only be converted to a higher voltage when all the PV cells are generating at least some current, since the current flowing through all the cells must be equal. In some cases, this limitation will prevent auxiliary electronic subsystems, in the receiving apparatus, from turning on until all cells are illuminated. Such auxiliary systems may be required for various important tasks such as identification of the charging beam and transmission of safety data to the transmitter. When this happens, the direction of reflection from the first beam is unknown, and a reflection from it may cross the second beam, and create a hazard spot, where safety limits need to be stricter—typically, if both beams are equal, doubled.

The current disclosure describes six possible solutions to avoid such a problem, depending on implementation, as follows:

(a) Keeping the power in the transmitted beams, at less than 50% of the safety threshold, after the first beam has locked on target and until a response from the receiver is received. This can be achieved either by increasing the sensitivity to the safety system or by separating the beams in time, such as turning on beam 1 for a short while, trying to lock it on target, turning it off, then turning on beam 2, trying to lock it, turning it off, and restarting again until both beams are locked on target.

(b) Having a second power source in the receiver, capable of allowing said auxiliary systems to operate even when only one beam illuminates one PV cell, such auxiliary power source may be later charged again when all PV cells are illuminated.

(c) Allowing the DC/DC circuit to operate in both serial mode and single PV mode, and configuring it to respond even when only a single PV cell is illuminated.

(d) Connection of the cells in parallel prior to illumination of the cells and then connection of the cells in serial once illumination is sensed.

(e) Connection of each cell, separately to a different DC/DC converter and connecting the output in parallel or in serial.

(f) Connecting the cells in parallel.

The output from multiple PV cells may be connected in parallel, which typically requires designing the DC/DC circuit to a lower operation voltage and higher currents. This generally results in either lower efficiency or higher cost, but with the added advantage of enabling the circuit to operate even when only a single cell is illuminated, without an additional power source, and without a DC/DC circuit capable of operating in both modes.

When more than one PV cell is present, the PV cells can be operated in a combination of serial and parallel connections, as long as the system still maintains the ability to respond with only a single PV cell illuminated. This may be done by direct connection of each PV cell to a DC/DC circuit, at least prior to illumination of a second cell, or by using another energy source for the necessary safety functions prior to illumination of a second cell.

Utilization of the Output of the Photovoltaic Cells

Typically, the output of the receiver should supply a constant, regulated voltage, such as 3.3V or 5V, which is kept to a tight margin from the nominal voltage. The energy level at the input of the PV cell is controlled by the transmitter, but is influenced by many other factors many of which are beyond the system's control, such as the effect of a human walking around with the receiver. It is therefore difficult to supply the exact amount of energy needed by the client load. Often, excess energy is generated and such excess energy is translated at the converter output to excess current, as the voltage is fixed, or excess voltage if the voltage is not fixed. This excess current cannot be force fed into the client load without increasing the voltage, which may be harmful to the client load, and thus needs to be stored or converted to a form of energy other than electrical energy.

The current disclosure suggests several methods for storing or converting the excess current to a different form of energy.

First the excess energy may be stored in capacitors and/or coils.

If a battery is present, the excess energy may be fed into the battery and stored there.

The excess energy may also be propagated by transmission from the receiver in the form of radio waves, light or infra-red energy.

Lastly the energy can be converted into heat, typically using a resistor or a Zener diode. A Zener diode is advantageous as it helps maintain a constant voltage at the output. Typically, the Zener diode is chosen so that it conducts at a voltage slightly higher than the desired output voltage, and it has the advantages that it is quick to respond and is of low cost.

Another method for converting the excess energy into heat is by operating the photovoltaic cell at a voltage that differs from its Maximum Power Point (MPP) voltage. The efficiency of power transfer from the PV cell depends on both the beam power falling on it and the electrical characteristics of the client load. As the beam illumination level varies, the load characteristic that gives the highest power transfer efficiency also varies. The efficiency of the system is optimized when the load characteristic is such as to maintain the power transfer at highest efficiency. This load characteristic is called the MPP, and Maximum Power Point Tracking (MPPT) circuits are used to present loads to the PV cells in order to get the most usable power out. By using a circuit which intentionally shifts the operating point away from the MPP, the photovoltaic efficiency can be reduced and the correct power to be delivered at the correct voltage to the target can be achieved under conditions where there is an excess of energy to be disposed of.

Intra-System and Inter-System Communication

In order to prevent beams generated by different transmitters sharing at least a portion of the same field of view, data should be transferred between systems, signaling the volume occupied by different beams. Each system should be capable of transmitting at least an indication signaling that its field of view may be occupied by a laser beam and typically transmits a set of data including the number of beams, wavelength, power, the origin in 3D space, the direction in 3D space, the beam diameter or equivalent, sensing capabilities, coherence length data, timing and duty cycle of beam data, the future trend of the beam data, as well as the manufacturer code and network parameters.

Each system should be capable of responding to at least a subset of the data. The data may be sent between systems, peer to peer, or to a common server, and may be received from other peers or from a main server. Typically, the data received and transmitted is similar, and is interpretable by the system as directions in which to avoid directing lasers, such as the cylinder at which a beam currently transmits power. A beam module is directed to have a different operational field of view when the same field of view, or a portion of it, is covered by another beam, such as an instruction to avoid powering a target which is already being powered by another beam.

The above mentioned communication channel, or an additional separate channel allows a beam module to detect other beam modules in its vicinity. The present disclosure proposes four methods of allowing a beam module to detect the presence of another beam module covering the same field of view, or a part of it.

(a) In a first system, a receiver, in optical communication with more than one beam, detects that it is in the field of view of more than one beam by identification of the beam IDs. It then transmits a signal, received by at least one of the beam modules or by an external control unit, indicating the presence of another receiver nearby.

(b) In a second system, each beam module transmits a signal, received by the other system such as by scanning the field of view with its laser, and the signal is received by the other beam module and is interpreted as an indication of the presence of the other system nearby.

(c) In a third system, the user him/herself indicates to one or more systems, the presence of another system sharing the same field of view.

(d) In a fourth system, the manufacturer packages several beam modules together, such as by connecting them mechanically, and configures the system to be aware of each other.

Communication may be done directly between the systems, or using a network or a server connection.

There is thus provided in accordance with an exemplary implementation of the devices described in this disclosure, a method of ensuring safety in a multiple beam wireless power transmission system comprising beam sources and multiple targets, the method comprising the steps of:

(a) determining if any points on trajectories of at least two beams come closer to each other than a predefined safe distance, and if so, either performing at least one of (i) attenuating at least one beam, (ii) turning off at least one beam, and (iii) diverting at least one beam, or sending data associated with the determining to a controller, the controller being adapted to perform at least one of (i) attenuating at least one beam, (ii) turning off at least one beam, and (iii) diverting at least one beam, based on analysis of the data, and (b) detecting if there is a reflective surface in the path of any beam by receiving at the transmission system, image data of a pattern on a target, and determining if an image generated from the image data has a mirror-imaged form compared to that of the pattern on the target, and if so, either performing at least one of (i) attenuating, (ii) turning off, and (iii) diverting at least the beam directed at that target whose image data of a pattern thereon has a mirror-imaged form, or sending data associated with the determining to a controller, the controller being adapted to perform at least one of (i) attenuating, (ii) turning off, and (iii) diverting at least the beam directed at that target whose image data of a pattern thereon has a mirror-imaged form, based on analysis of the data.

In the above described method, the image data may be electronic image data, which may be obtained by scanning the target with a beam. Accordingly, the image data may be accumulated by collection of electronic data transmitted from the target, or by use of a camera.

The above described methods may further comprise the step of issuing an alert if either of the determinations of steps (a) and (b) are positive.

Additionally, in any of the above described methods, at least one of the beams may be a transmitted beam from a beam source, or it may be a beam reflected from a target.

According to yet further implementations of the above described methods, the attenuating of a beam may be performed by adjustment of the beam source, the turning off of a beam may be performed at its beam source or by use of a shutter, and the diverting of at least one beam may be performed by use of a beam scanning device.

Furthermore, a trajectory of a beam transmitted by a beam source may be determined by use of the known position of the beam source, and the known orientation and position of a beam scanner device used to direct the beam in space. In the case of a reflected beam, its position and orientation may be determined by ascertaining the trajectory of a transmitted beam impinging on the target, and the position and orientation of the target.

In that case, the position and orientation of the target may be determined by using at least one of an accelerometer and a compass mounted in a known position relative to the target.

Alternatively, the position and orientation of the target may be received from a device mechanically connected to the target, or alternatively, it may be calculated by analyzing an image of the target or a pattern on the target.

In any of the previously described methods, the determining if any points on trajectories of at least two beams come closer to each other than a predefined safe distance, may comprise:

(i) determining the position and orientation of a first beam and a second beam,
(ii) calculating at least one plane including the first beam, each of the planes comprising the trajectory of the first beam,
(iii) determining at least one point where the second beam crosses one of the at least one plane, and
(iv) measuring the distance between each of the at least one points from the trajectory of the first beam.

According to yet further implementations of the methods described hereinabove, if any points on trajectories of at least two beams come closer to each other than the predefined safe distance, the analysis further comprises determining if the expected combined power level of the at least two beams is greater than a predetermined safe level.

The analysis of the data resulting from the step of determining if any points on trajectories of at least two beams come closer to each other than the predefined safe distance, may further comprise calculating an overall risk associated with two or more beams by considering both a probability of intersection of the beams, and a probability that the combined power levels of the beams will exceed the predetermined safe level.

Finally, in any of the above mentioned methods, at least some of the targets may be mounted on mobile telephone devices.

There is further provided, according to other implementations described in this disclosure, a system for transmitting wireless power to multiple targets adapted to receive the wireless power, the system comprising, (i) at least two beam sources, each generating a beam of the wireless power,
(ii) a beam scanning device associated with each beam source, each beam scanning device adapted to direct a transmitted beam towards a target,
(iii) an imaging unit disposed on the transmitting system, adapted to generate image data of a pattern on any of the targets, and
(iv) a controller configured to perform the steps of:
(a) determining if any points on trajectories of at least two beams come closer to each other than a predefined safe distance, and if so, configuring the controller to cause the system to perform at least one of (i) attenuating at least one beam, (ii) turning off at least one beam, and (iii) diverting at least one beam, and (b) detecting if there is a reflective surface in the path of any of the beams, by receiving at the transmission system, the image data of the pattern, and determining if an image generated from the image data has a mirror-imaged form compared to that of the pattern on the target, and if so, configuring the controller to cause the system to perform at least one of (i) attenuating at least one beam, (ii) turning off at least one beam, and (iii) diverting at least one beam.

In such a system, the relative geometric position of the at least two beam sources is known.

In the above described system, this knowledge can be obtained either by virtue of a mechanical connection between them, or by performing vector calculations based on:

(a) the relative vectorial position of at least two targets,
(b) the vectorial position of a first target receiving a beam from a first one of the at least two beam sources, relative to the first beam source, and
(c) the vectorial position of a second target receiving a beam from a second one of the at least two beam sources, relative to the second beam source. In this case, the relative positions of the at least two targets is known by virtue of the at least two targets being incorporated into a single receiver.

BRIEF DESCRIPTION OF THE DRAWINGS

The invention will be understood and appreciated more fully from the following detailed description, taken in conjunction with the drawings in which.

DETAILED DESCRIPTION

Figure 1:
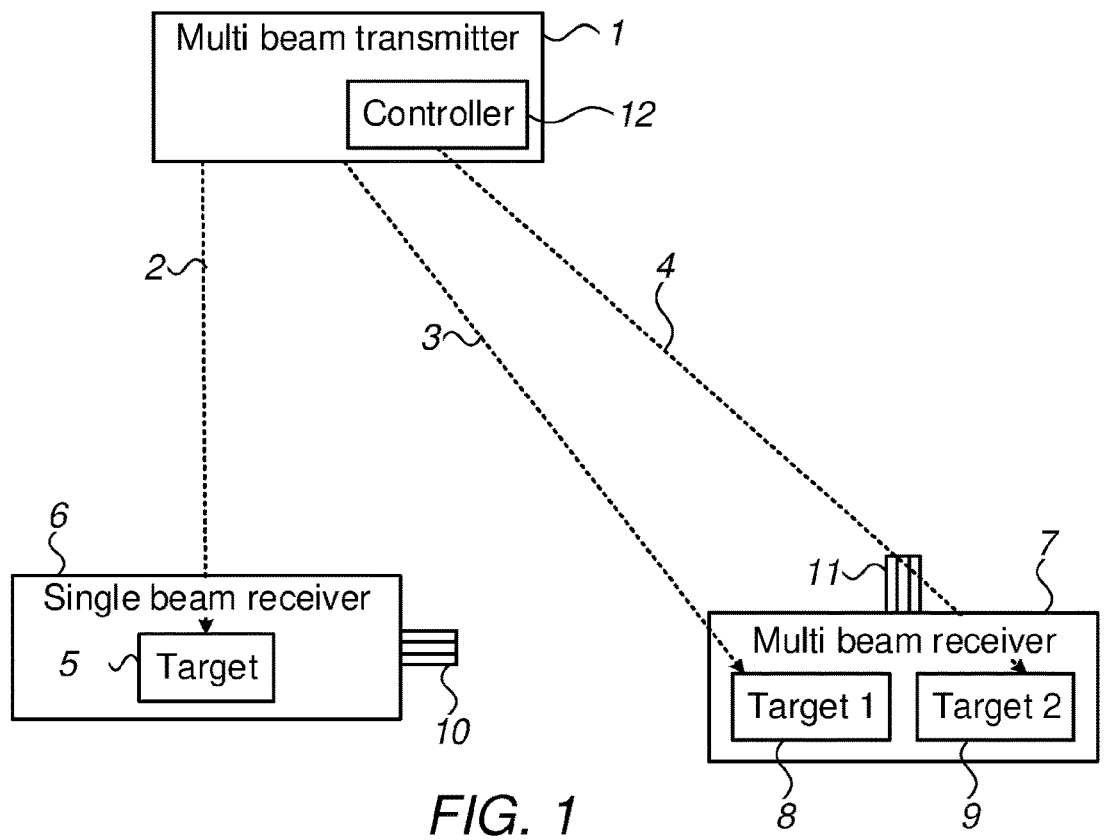
FIG. 1 is a schematic illustration of a multi beam transmitter, emitting three distinct beams towards a pair of receivers.

Reference is now made to FIG. 1, which illustrates schematically a multi beam transmitter 1, emitting three distinct beams 2, 3, 4 towards receivers 6 and 7, and incorporating a controller 12 for controlling the relevant operation of the system, as described in the Summary Section hereinabove. Although the control system is shown installed in a transmitter unit in FIG. 1, it is to be understood that it can, as described in the Summary Section hereinabove, be disposed elsewhere or even distributed over several systems and locations in the vicinity.

Receiver 6 includes a single target 5, at which beam 2 is aimed. The power of beam 2 is converted by receiver 6 into electrical power at a stabilized voltage that is supplied to a client device (such as a phone, not shown in the drawing) through power connector 10, which could be integral to the receiver.

Both beams 3 and 4 are used to deliver power to multi target receiver 7. Beam 3 is aimed at target 8 and beam 4 is aimed at target 9. Receiver 7 converts the optical power from both beam 3 and 4 into electrical power, sums up the power from both beams and delivered it to the device to be charged.

Receiver 6 responds and transmits data when it detects beam 2. Receiver 7 responds and transmits data when it detects either beam 3 and/or beam 4.

The method of data transmission is not shown, it is typically achieved through RF, IR, or through an internet connection and is typically received by the transmitter for data analysis.

The transmissions typically include receiver ID, beam or beams ID, power received, whether total and per each beam, and orientation information, but it may include other data or just a portion of the data.

Beams 2, 3, and 4 are not shown as crossing each other and are not on the same plane and reflections from the receivers also do not cross each other and do not cross the incident beams.

Figure 2:
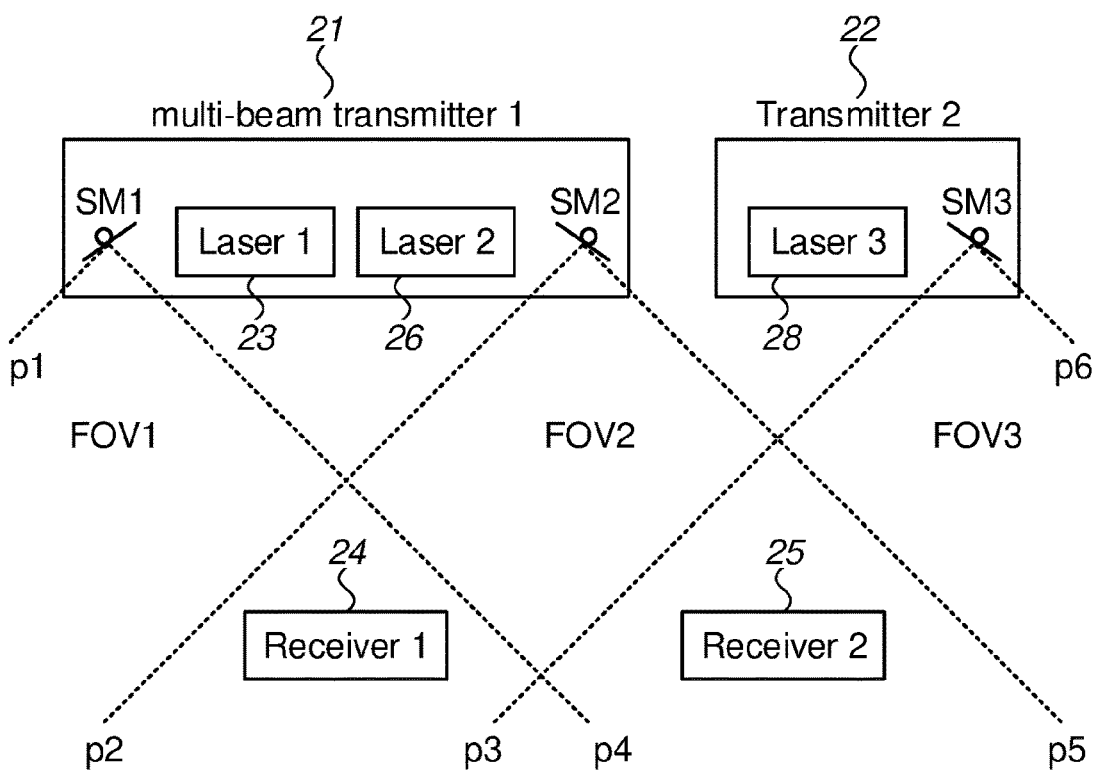
FIG. 2 shows an exemplary multi beam transmitter and a single beam transmitter.

Reference is now made to FIG. 2, which shows a multi beam transmitter 21 and a single beam transmitter 22. Multi beam transmitter 21 includes a first beam module composed of laser 23 and steering mirror SM1 and has a field of view limited by the maximal capabilities of steering mirror SM1 to tilt the beam. The field of view FOV1 extends up to the line passing through steering mirror SM1 and point p4 at one extent of the field of view, and the line passing through steering mirror 5M1 and point p1 at the other extent of the field of view. It is to be understood that this description is given a 2-dimensional explanation, due to the nature of the 20 drawing, but the real field of view is typically a 30 rotation of such a 20 representation.

Transmitter 21 also includes a second beam module composed of laser 26 and steering mirror 5M2 and has a field of view limited by the maximal capabilities of steering mirror 5M2 to tilt the beam, the field of view FOV2 extending up to the line passing through steering mirror 5M2 and point p5 on the one end, and the line passing through steering mirror 5M2 and point p2. It is to be understood that such a description is 2-dimensional due to the nature of this 20 drawing and the real field of view is typically a 30 rotation of such a 20 representation.

Transmitter 22 includes a third beam module composed of laser 28 and steering mirror 5M3 and has a field of view limited by the maximal capabilities of steering mirror 5M3 to tilt the beam, the field of view FOV3 extending up to the line passing through steering mirror 5M3 and point p6 on the one end, and the line passing through steering mirror 5M3 and point p3. It is to be understood that this description is 2-dimensional due to the nature of this 2D drawing and the real field of view is typically a 3D rotation of such a 2D representation.

Receiver 24 is inside FOV1 and FOV2 and outside of FOV3

Receiver 25 is inside FOV3 and FOV2 and outside of FOV1

Receiver 24 can therefore be powered using laser 23 or using laser 26

Receiver 25 can therefore be powered using laser 26 or using laser 28

Receivers 24 and 25 detect which of the beams, if any, are powering them, typically by decoding information encoded on the beam(s) itself. Each receiver measures the received power of the beam powering it, and transmits receiver 10, receiver orientation, detected beam 10, received power per beam, capabilities, and other data, which is received by both transmitter 21 and by transmitter 22 and potentially by other receivers and system components.

Transmitter 21 is aware of the relative starting points and directions of lasers 23 and 26, since the position in space and the orientation of the steering mirror is known, as is the position of the receivers, and transmitter 21 can thus direct the beams to avoid intersecting each other. When both laser beams are in the same plane, and are converging, transmitter 21 calculates their intersection point (if any) and should they intersect, estimates the risk from both beams, in order to decide if an overall risk exists.

When receiving the data from receivers 24 and 25, transmitter 21 calculates, based on the model ID and on the tilt (usually calculated relative to the gravitational vertical and the magnetic north) and on the range of each receiver the directions of the reflections from each receiver and preforms an assessment of where potential crossing points, if any, are located.

Receiver 25 is in the field of view of both transmitters 21 and 22, so that it may detect a beam sent by each transmitter and report it. The transmitter that did not send the beam receives the report transmission and begins a procedure to locate and communicate with the other transmitter sharing the same field of view.

After a communication channel between both transmitters 21 and 22 is established, information about the direction of beams and reflections is exchanged.

Figure 3:
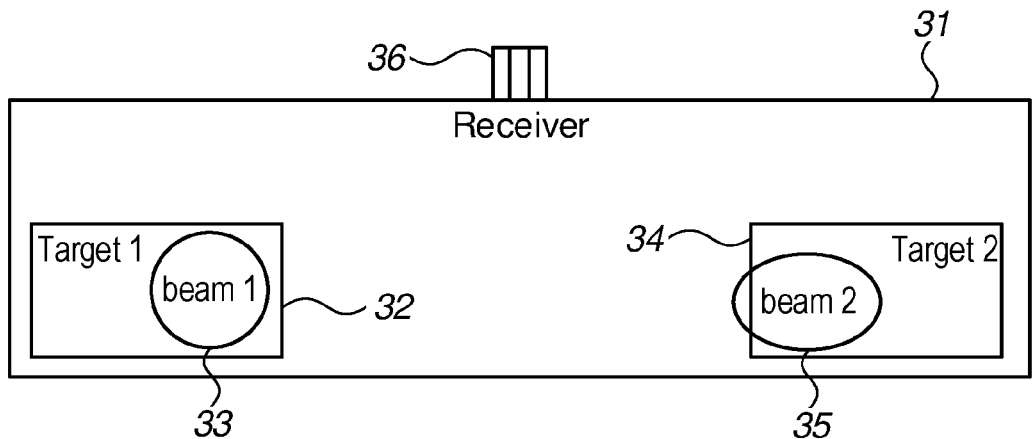
FIG. 3 which shows an exemplary receiver having two targets for receiving at least two beams.

Reference is now made to FIG. 3 which shows an exemplary receiver 31 having two targets 32 and 34 for receiving at least two beams 33 and 35, converting the power in the beams into electrical power and supplying it through conductor 36 to a system utilizing it.

Beams 33 and 35 have a size and shape allowing them to be almost fully absorbed by receiver 31 both in target 32 and 34.

Beam 33 is aimed at target 32 and is completely surrounded by the boundaries of target 32 while beam 35, aimed at target 34 slightly extends from it. It is possible to use the scanning feature of the beam source to image the target at low power and to ensure that a beam such as beam 35 is centered on the target, before allowing the beam source to raise its power output to that necessary for power transmission to the target.

Receiver 31 has a front surface which may generate a reflection of small portions, typically between 0.1% and 4%, but occasionally up to 25%, of either beam 33 or 35. The extent of the reflection may be dependent on contamination on the surface, and on the angle of incidence.

Receiver 31 is equipped with a detector for detecting its spatial orientation, such as a camera, a compass, a gyroscope, an accelerometer, a compass, a GPS device, a triangulation device, or an electronic connection to a device capable of determining its relative orientation, as well as a data transmitter to communicate that information to the transmitters. A common and inexpensive orientation and position detection system can be readily achieved by use of accelerometers as gravity direction detectors, in conjunction with compasses. Such devices are widely available as MEMS-based chips. The transmitter sources must also be equipped with similar components, so that the coordinate system of the receivers can be directly related to those of the sources.

Triangulation devices can be in either the transmitter or in the receiver, by measuring the distance or echoes (sound, light, radio) from the other device.

Beam 35 is shown slightly off target, which typically causes receiver 36 to report either a "not on target message" or lower power received measurements.

Figure 4:
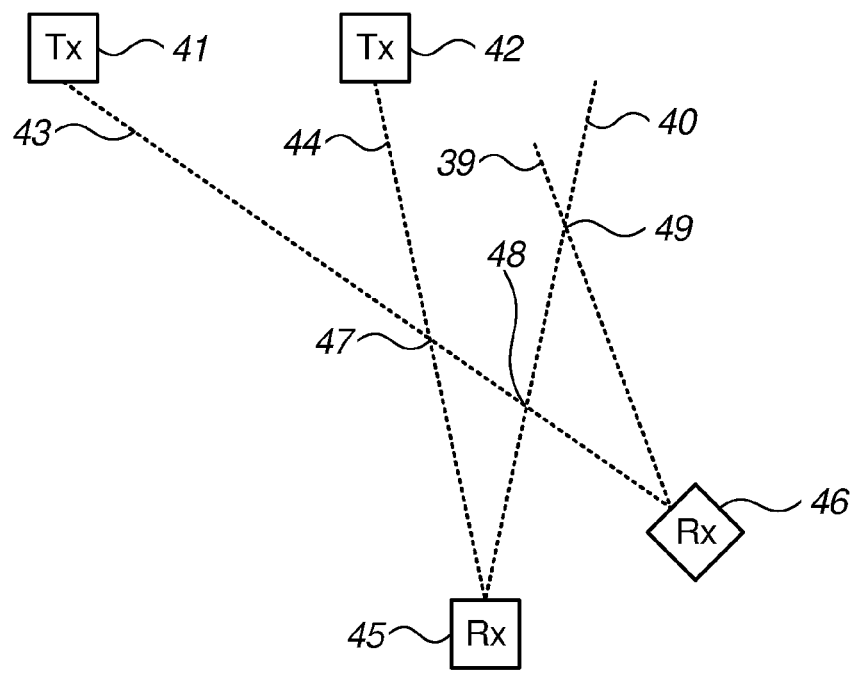
FIG. 4 shows the generation of beam intersection points in such a multi beam transmission system as shown in FIG. 2, and the hazards thereby generated.

Reference is now made to FIG. 4, which shows the generation of beam intersection points in such a multi beam transmission system as shown in FIG. 2, and the hazards thereby generated.

In such an exemplary system, transmitters or beam generating modules 41 and 42 are transmitting beams 43 and 44 towards receivers 45 and 46 respectively. A portion of beam 44 is reflected from the front surface of receiver 45, as reflection 40. A portion of beam 43 is reflected off the surface of receiver 46 as reflection 39.

Beam 44 crosses beam 43 at point 47

Reflection 40 crosses reflection 39 at point 49

Beam 43 crosses reflection 40 at point 48

It is to be understood that image of FIG. 4 is a 2D image, used to explain a 3D situation, and differences between it and a 3D reality are expected.

It is also to be understood that beams and reflections in the real 3D world have widths, and any situation where beams are close to each other, typically within a distance of 1 to 10 mm, and sometimes even at 50 mm distances, may have similar consequences.

A person or an object at points 47, 48, 49 may be exposed to levels of radiance, power, energy, energy averaged over a circular area having a diameter of 1 mm, 3.5 mm, 7 mm, 50 mm or 10 mm. hotspots, hotspots created as a result of coherent or incoherent effects, that are above acceptable levels or are another general risk from the system. This risk can arise from various aspects of exposure. Skin burn risk arises from "hotspots", eye damage from averaging the power over the area of the pupil. Fire hazard from a small particle from "hotspots", fire hazard from a larger particle depends on total energy absorbed, the risk for a person looking at the system through a telescope may be measured by averaging the power over the lens of the telescope (50 mm). The system has to evaluate the various risks.

To prevent such exposure above allowed levels at such hazardous intersection points, the system either alters the parameters of one or both beams—such as power or direction—or terminates one beam, typically replacing it with another.

Effects such as coherence between the beams, mechanical instability, optical and pointing instability, uncertainty in direction and noise in the system may significantly increase the distance which is considered to be hazardous, between beams/reflections.

The points 47, 48, 49 are considered "hazardous points" and require the special attention of the safety system.

Specifically, for other portions of the beams, a safety system does not need to take into account the other beams in the vicinity, but at such "hazardous points" the safety system is required to consider parameters from both beams, or to avoid such a situation.

Figure 5:
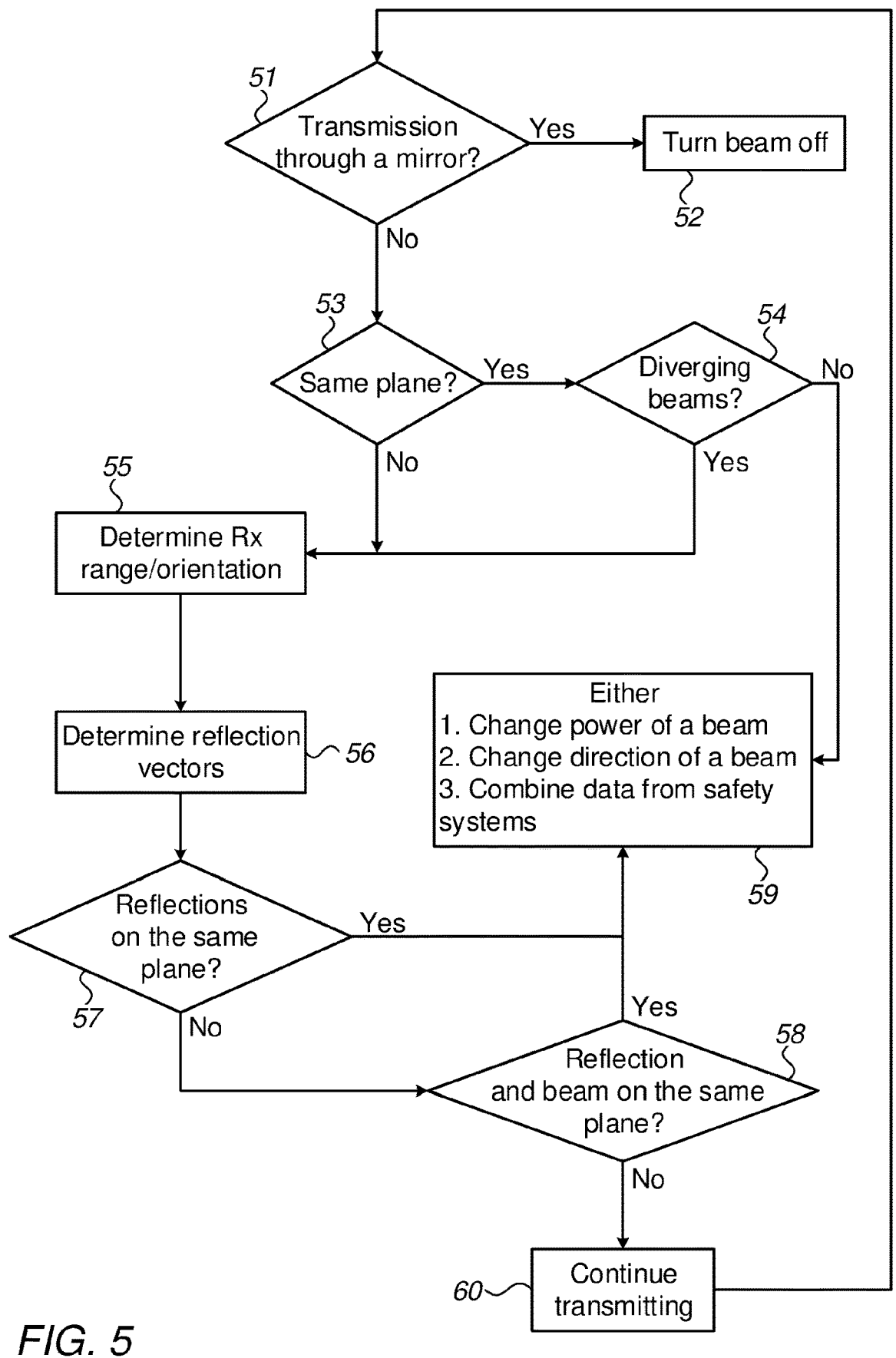
FIG. 5 illustrates a flow chart of a method of managing the multi beam transmission in accordance with the methods of the present application, to ensure proper control of beam intersections.

Reference is now made to FIG. 5, which illustrates a flow chart of a method of managing the multi beam transmission in accordance with the methods of the present application, which will ensure proper control of beam intersections. During transmission the following method is implemented continuously.

In step 51 the system verifies if any beam is transmitting along a path impinging on a mirror. If a beam is found to be transmitting via a mirror, then in step 52, that beam is either attenuated or typically turned off.

If no beam is found to be transmitted via a mirror, the system checks 53 if the beams are in the same plane. Beams that are in the same plane are checked to see if they are diverging or converging in step 54. Steps 54 and 53 may be performed in any order. For beams in the same plane that are not converging, the range and the direction of reflection vectors are determined in steps 55 and 56 (again order is not important) and then in step 57, it is estimated if any two or more reflections are in the same plane. If none are found, then in step 58, it is estimated whether any reflections are in the same plane as a beam. If none are found, then the system continues transmission, typically performing some or all of these actions iteratively in step 60.

If in step 54, beams are found to be converging and in the same plane, then in step 59, either the data from the two relevant safety systems is combined into a unified risk assessment for the two beams, raising the safety threshold by so doing, or at least one of the beams is either attenuated or diverted.

Likewise, in either of steps 57 and 58, if beams/reflections are found to be just in the same plane, even without determining the likelihood of an intersection, then the method also proceeds to step 59, with the same actions performed there.

Figure 6:
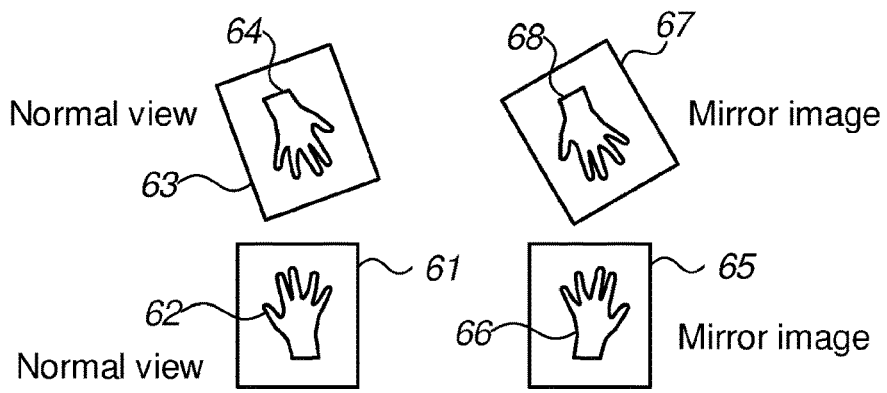
FIG. 6 illustrates how the system determines if any mirror surface is disposed within the passage of any beam from transmitter to target.

Reference is now made to FIG. 6, which illustrates how the system determines if any mirror surface is disposed within the passage of any beam from transmitter to target. Receiver 61 has an asymmetrical pattern 62 on it. When scanned or viewed through a mirror, receiver 61 will appear as image 65 with asymmetrical pattern 66 on it. Since pattern 66 differs from pattern 62 in all types of rotation, the system detects that image 65 is viewed through a mirror and responds to it by turning the beam off.

Image 63 with asymmetrical pattern 64 is a view of receiver 61 and pattern 62. By rotating pattern 64 it can be overlapped with pattern 62 and it is therefore clear to the system that pattern 64 is not viewed or scanned through a mirror.

On the other hand, the pattern 68 on image 67 of receiver 61 cannot be overlapped with pattern 62, which is known to the transmitter. Thus the system can deduce that pattern 68 is being viewed or scanned through a mirror reflection.

If the system detects a receiver and determines that it is being viewed through a mirror, then it refrains from transmitting power to it via the mirror. It may further record the position for further use, which may include refraining from scanning the same position again, or lowering the frequency of such scans Calculation of the mirror's position, which requires detection of the real object as well as detection of the "mirror image" of it, may be done by solving the paired equations:

$$V1 = V2 + V3$$

$$V4 = V2 - V2 * |V3|/|V2|$$

$$|V2| + |V3| = |V1|$$

$$|V1| = |V4|$$

where V1 is the vector to the real object,
V4 is the vector from the beam source to the "mirror image",
|Vn| is the length of the vector |Vn|,
V2 is the vector to the point on the mirror the beam impinges on the mirror, and
V3 is the vector from that point to the mirror image of the receiver.

There may be many variations of this scheme of vectorial calculation.

The mirror is found at V2 and its direction can be found from splitting the angle between V2 and V3.

The mirror's position may be further used to simplify the location of the real receiver, instead of the mirror image, when another "mirror image" of a receiver is found at a point which appears to be reflected by the same mirror, the real position of the receiver viewed through the mirror may be estimated to assist in locating it.

The asymmetrical image may preferably be a 2D barcode, allowing identification of the receiver, its type, make, capabilities, and limitations. This data may then be further used for other applications such as billing, quality of service, as well as many other uses.

Figure 7:
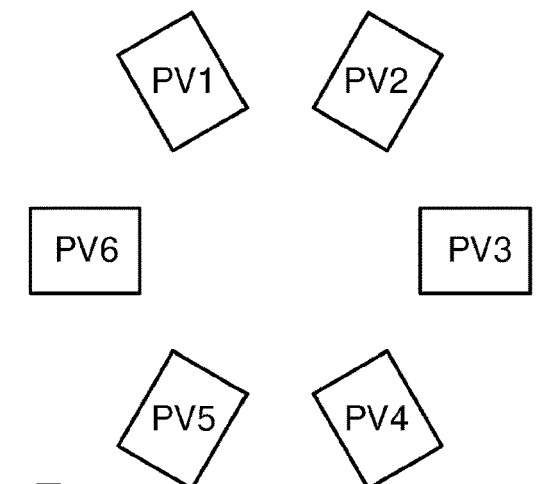
FIG. 7 illustrates schematically a purely electronic method of determining the symmetry of the images target markings.

Reference is now made to FIG. 7, which illustrates schematically a purely electronic method of determining the symmetry of the images target markings.

PV1, PV2, PV3 . . . PV6 are all beam targets equally spaced and aligned to the edges of a degenerated hexagon.

Such a pattern is optically symmetric since its mirror image appears optically identical to the original pattern, but as a rotation of the original pattern.

However, in the context of a receiver capable of reacting differently to illumination of different parts of the pattern, such a pattern may become asymmetric, as the system may electronically identify each target.

For example, if a beam is aimed at target PV3 (as opposed to the mirror image of PV3, which may be PV4), the system should be in possession of this information. In order to verify that the beam has not undergone a mirror reflection, the beam is then aimed at the target located a single or more target steps clockwise or counterclockwise. If the beam is aimed one or more target steps forward clockwise and reaches target shape PV4 (as opposed to PV2), then it is not being viewed through a mirror. If it were being viewed through a mirror, it would reach target shape PV2 (and not PV4). Thus, the presence of a mirror reflection in the beam trajectory being monitored, can be determined electronically, and without the need of any imaging step, by observing which target shape is imaged after a known beam movement has been performed.

A similar algorithm may be performed using multiple beams, or use can be made of a pattern consisting of optical as well as electronic markers.

Figure 8:
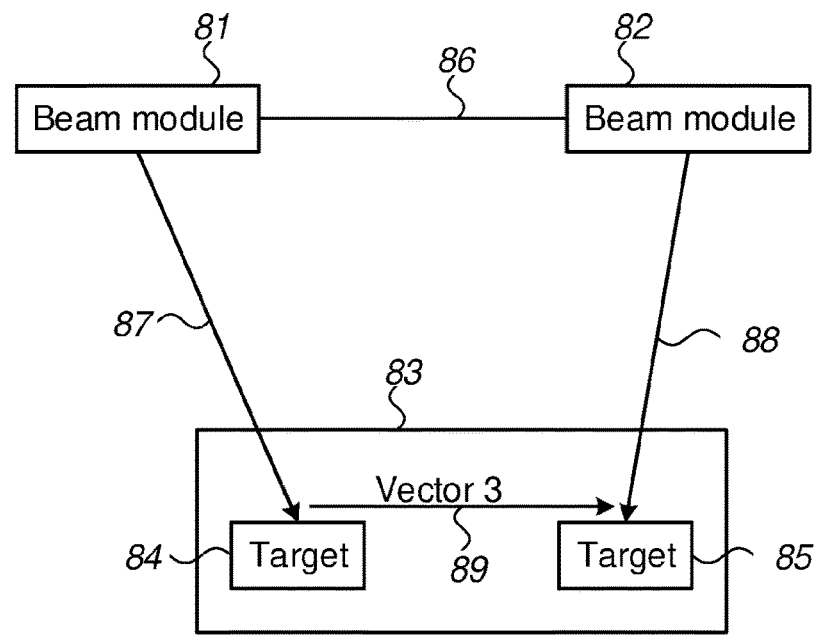
FIG. 8 illustrates schematically how the relative position of two beam sources and their targets may be determined by vector subtraction of the known positions of the beam sources relative to the targets in the receiver.

Reference is now made to FIG. 8, which illustrates schematically how the relative position of two beam sources and their targets may be determined by vector subtraction of the known positions of the beam sources relative to the targets in the receiver, the vector relationship between the two targets being known since they are both built into a single receiver.

Beam module 81 and beam module 82, whose comparative positions are sought, are both aimed at power receiver 83 which includes two targets 84 and 85.

In order to determine the relative distance and direction of beam module 82 with reference to beam module 81, i.e. vector 86, beam module 81 uses vector 87, which is the position of target 84 in receiver 83 which it knows by transmitting a beam to it.

It also uses vector 89, which is reported by receiver 83, which is the direction and distance between target 84 and target 85

It also uses vector 88, which may be reported by beam module 82, by an external server or by receiver 83 Vectors 87+89-88 must equal Vector 86 which is the position of beam module 82 relative to beam module 81.

Beam module 82 either performs a similar calculation or receives the information from beam module 81 or from a central control point, as can beam module 81. These situations can occur if there are many beam modules in the room, and the location of some of the beam modules positions are already known. Then, if a new beam module is found, it may receive the positioning information and does not need to compute it. There is need just to locate the new beam module relative to only one other beam module.

As described in this disclosure hereinabove, in the Summary section, a novel method is presented of determining if two beams have an intersection point, or at least get close to an intersection point. A set of planes are incrementally rotated around the trajectory of one beam, which is thus located at the common axis of rotation of the incrementally rotated planes. It is then determined whether the second beam passes through any of these incrementally rotated planes within a predetermined minimum distance from the first beam. If so, then those beams are considered to have an intersection point, or a close-to-intersection point, and in order to ensure laser safety, appropriate action must be taken to reduce the risk, such as by shutting down or reducing the laser power of at least one of the beams, or by diverting one of the beams. In practice, this method may be performed by calculating the plane formed by a first beam and at least one point on a second beam.

This point may typically be the beam origin or its target, since these points are best known and easiest to calculate. Then if another point on the second beam is close to the first beam axis, typically, within a few mm, or within a few radii of the beam, then intersection is likely and further action to alleviate the hazard of such an intersection, as described above, may be needed. On the other hand, if the closest point to the plane on the second beam is far from it, typically, more than a few mm, more than the calculation error margin, or more than a few beam radii, then the initial risk potential is lower.

Figure 9:
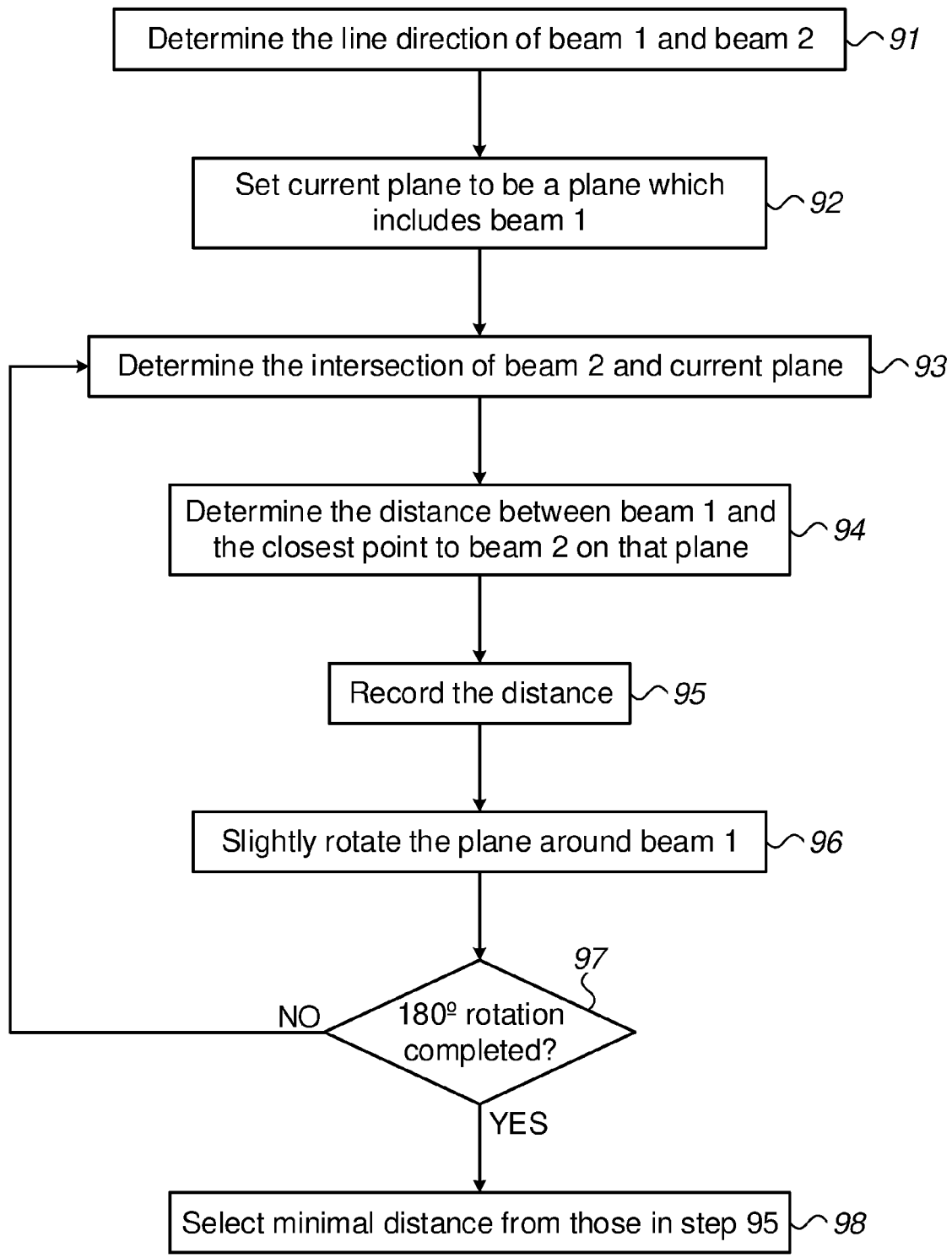
FIG. 9 is a flow chart describing the steps taken according to one exemplary procedure, to ascertain if two beams intersect, or at least pass within a predetermined minimal distance from each other.
Figure 10:
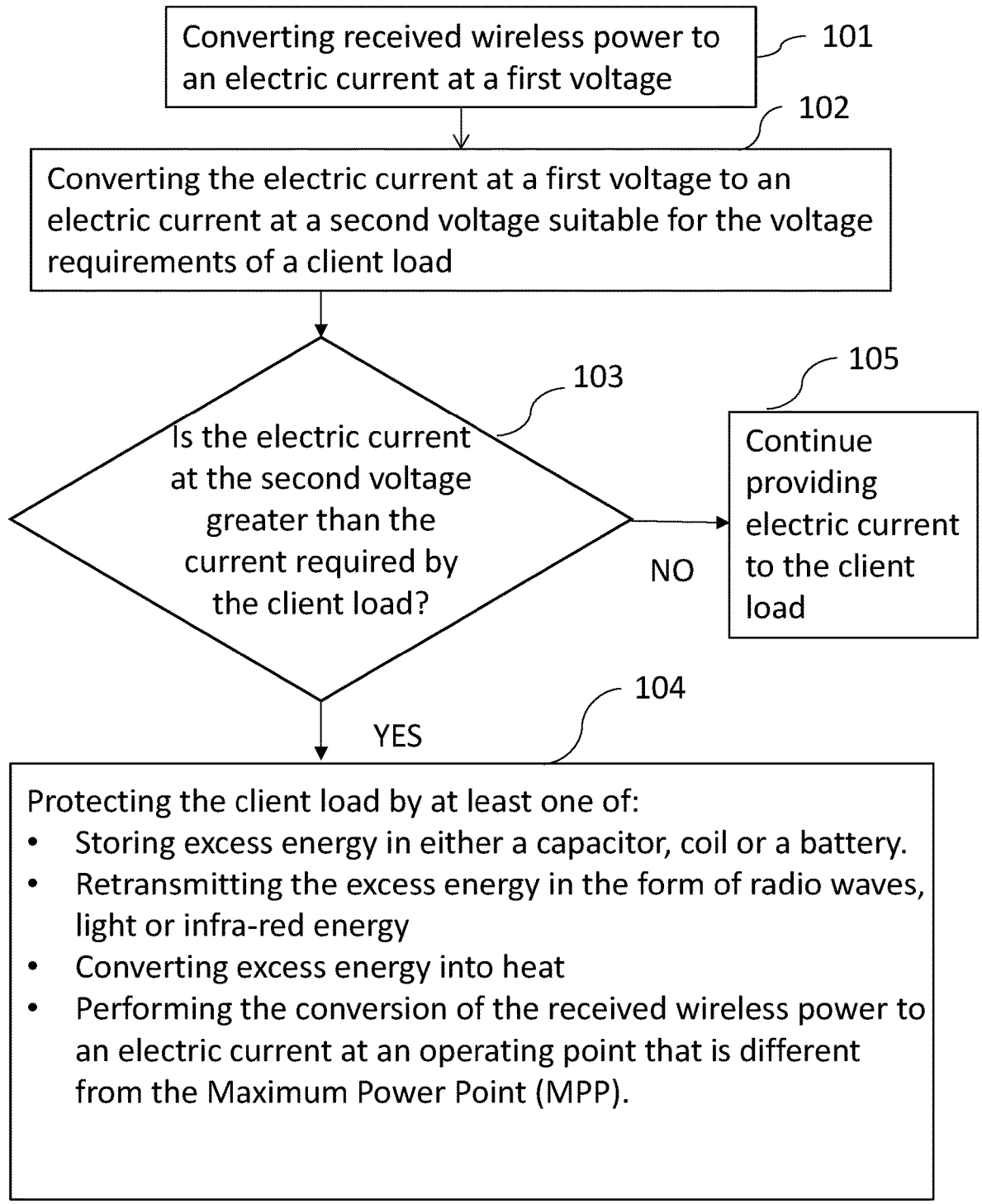
FIG. 10 is a flow chart of a method of managing an electric current that is in excess of that required by a client load.

Reference is now made to FIG. 9, which describes the steps taken according to one exemplary procedure, to ascertain if two beams intersect, or at least pass within a predetermined minimal distance from each other.

In step 91, the beams are delineated in three-dimensional geometrical coordinates, using the information regarding the settings of the beam scanners in the beam transmitters, and the location and orientation of the receivers, as described hereinabove.

In step 92, one of the beam trajectories is selected, and a reference plane is defined containing that beam line.

In step 93, the intersection of the second beam with the reference plane is determined.

In step 94, the closest distance in the reference plane between the first beam path, and the point of intersection of the second beam with the reference plane is calculated, by stretching a line from that point of intersection to the first beam path, that makes a right angle with the path of the first beam.

In step 95, that closest distance is recorded and related to the angle of the reference plane in which the previous steps have been performed.

Then, in step 96, the reference plane containing the first beam path representation, is rotated around the line of the first beam path, by a predetermined incremental angle, typically less than 50, and step 93 is again performed, to determine the new intersection of the second beam with the reference plane.

Steps 94 and 95 are then performed at this new position of rotation, and the closest distance is recorded for the new angle of the reference plane.

This procedure is repeated for additional incremental rotations until in step 97, it is determined that the reference plane has been rotated through 1800, and the procedure proceeds to step 98.

In step 98, from all of the recorded closest distances, the minimum distance is selected, this defining the closest that beam 2 will come to beam 1. This result is then used to decide whether those 2 beams are considered to have an intersection point, or a close-to intersection point, and in order to ensure laser safety, to initiate appropriate action to reduce the risk engendered by the increased power that may exist at such an intersection of beams.

There are other methods for determining the nearest distance between two beams, which may involve algebraic calculations such as follows.

If beam 1 is defined as $P_1 = t_2 d_2 + r_1$
where t is the free variable, d is the direction vector and r is the origin,
and beam 2 is defined as $P2 = t_2 d_2 + r_2$
then the minimal distance between the lines is given by:

$$\frac{d_1 X d_2 * (r_1 - r_2)}{\|d_1 X d_2\|}$$

Other methods of calculating the same nearest distance may alternatively be used.

It is appreciated by persons skilled in the art that the present invention is not limited by what has been particularly shown and described hereinabove. Rather the scope of the present invention includes both combinations and sub-combinations of various features described hereinabove as well as variations and modifications thereto which would occur to a person of skill in the art upon reading the above description and which are not in the prior art.

What is claimed is:

1. A method of controlling the electrical power output of a device wirelessly charged by a wireless power beam, the method comprising:

converting the received wireless power to an electric current at a first voltage;

converting the electric current at the first voltage to an electric current at a second voltage suitable for the voltage requirements of a client load; and if the level of the wireless power input to the device increases, such that the electric current at the second voltage is greater than the current required by the client load, thereby endangering the client load, in addition to, or as an alternative to storing the excess energy generated by the current in excess of that required by the client load, either in a capacitor, a coil or a battery, performing at least one of:

(i) retransmitting the excess energy from the device in the form of radio waves, light or infra-red energy;

(ii) converting the excess energy into heat; or (iii) performing the conversion of the received wireless power to an electric current at an operating point that is different from the Maximum Power Point (MPP).

2. A method according to claim 1 wherein the converting of the excess energy into heat is performed in a resistor or a Zener diode.

3. A method according to claim 1 wherein the current generated when the conversion of the received wireless power to an electric current is performed at an operating point that is different from the Maximum Power Point (MPP), is dissipated as heat.

4. A method according to claim 1, wherein the method compensates for the changes in the input level of wireless power to the device, as a result of movement of a receiver relative to the position of a transmitter.

5. A method according to claim 1, wherein the wireless power beam is an optical beam, and the conversion of the received wireless power to an electric current is performed by at least one photoelectric cell.

6. A method according to claim 5, wherein the at least one photoelectric cell is at least two photovoltaic cells arranged in series, and the method compensates for changes in the input of wireless power to the device arising from differences in the wireless power falling on each of the at least two photoelectric cells.

7. A method according to claim 5, wherein the at least one photovoltaic cell is adapted to withstand excess heat generated in converting the received wireless power to an electric current when performing the conversion at an operating point that is different from the Maximum Power Point (MPP).

* * * * *